United States Patent
Cawthorne et al.

(10) Patent No.: US 7,277,781 B2
(45) Date of Patent: Oct. 2, 2007

(54) METHOD OF UNDERVOLTAGE PROTECTION DURING ENGINE CRANKING

(75) Inventors: William R. Cawthorne, Milford, MI (US); Larry T. Nitz, Brighton, MI (US)

(73) Assignees: General Motors Corporation, Detroit, MI (US); DaimlerChrysler AG, Stuttgart (DE); DaimlerChrysler Corporation, Auburn Hills, MI (US)

( * ) Notice: Subject to any disclaimer, the term of this patent is extended or adjusted under 35 U.S.C. 154(b) by 505 days.

(21) Appl. No.: 10/845,999

(22) Filed: May 14, 2004

(65) Prior Publication Data

US 2005/0256617 A1   Nov. 17, 2005

(51) Int. Cl.
*G06F 17/00* (2006.01)
(52) U.S. Cl. .................. 701/22; 701/113; 180/65.2
(58) Field of Classification Search ...... None
See application file for complete search history.

(56) References Cited

U.S. PATENT DOCUMENTS 6,633,153 B1 * 10/2003 Blackburn ............ 320/132

2002/0183918 A1 * 12/2002 Theisen et al. ............ 701/113

FOREIGN PATENT DOCUMENTS

WO   WO 03/049965 A1 *  6/2003

\* cited by examiner

*Primary Examiner*—Michael J. Zanelli

(57) ABSTRACT

A method for controlling the cranking of an engine of a vehicle powertrain system having a rechargeable energy storage system that is adapted to provide electric power to an electric machine, wherein the system is adapted to exit from the engine crank state as a function of an output voltage of the energy storage system to the electric machine during the crank state, if the output voltage is less than a crank undervoltage threshold for a predetermined crank time. According to the method, the crank undervoltage threshold is a function of the number of failed start attempts, generally decreasing as a function of the number of failed start attempts. The predetermined crank time is a function of a magnitude of a difference between the output voltage and the crank undervoltage threshold.

20 Claims, 4 Drawing Sheets

METHOD OF UNDERVOLTAGE PROTECTION DURING ENGINE CRANKING

TECHNICAL FIELD

The invention is generally related to undervoltage protection for energy storage systems during engine cranking. More particularly, the invention is related to undervoltage protection of the energy storage system of a hybrid electric vehicle powertrain system during engine cranking.

BACKGROUND OF THE INVENTION

Hybrid electric vehicle powertrain systems frequently utilize a high voltage energy storage system, such as a battery pack, to provide electric energy to an electric drive motor to produce the necessary output torque to crank the combustion engine. Under most conditions, the battery pack has adequate energy capability and capacity to crank and start the combustion engine. However, under certain circumstances the capacity of the battery may not be sufficient to start the engine. For example, in extremely cold ambient temperature conditions the state of the fuel and its ability to be delivered to the engine, high frictional losses and other factors may make the combustion engine difficult to start. Under such conditions, more battery power may be required to crank the engine. In addition, lack of fuel or other factors either internal or external to the powertrain system may make it difficult or impossible for the engine to start, thereby leading to the use of excessive amounts of battery power to crank the engine.

Repeated cranking attempts due to cold ambient conditions, lack of fuel, or other factors can result in depletion of and potential degradation of the high voltage energy storage system. The primary causal factor associated with battery degradation under discharge conditions is extremely low battery voltage.

Typical undervoltage battery protection algorithms establish a low voltage threshold or limit. When the actual system output voltage falls below the threshold, further discharge is disabled to protect the battery system. Repeated discharge attempts, such as those caused by cranking an engine that does not start, may result in the battery voltage reaching the low voltage threshold, whereupon the system will not permit additional discharge of the battery and no additional cranking of the engine is possible. This may result in an inoperable vehicle without providing warning to the operator that future start attempts would be inhibited.

Therefore, it is desirable to provide battery undervoltage protection which limits cranking in an undervoltage condition while also reserving sufficient battery energy for a number of crank attempts. It is also desirable to provide an indication to an operator of the number of remaining crank attempts or that future crank attempts may be restricted.

SUMMARY OF THE INVENTION

The present invention is a method for controlling the cranking of an engine of a vehicle powertrain system having a rechargeable energy storage system that is adapted to provide electric power to an electric machine, wherein the system is adapted to exit from the engine crank state as a function of an output voltage of the energy storage system to the electric machine during the crank state, if the output voltage is less than a crank undervoltage threshold for a predetermined crank time. According to the method, the crank undervoltage threshold is a function of the number of failed start attempts, generally decreasing as a function of the number of failed start attempts. The predetermined crank time is a function of the magnitude of the difference between the output voltage and the crank undervoltage threshold.

This method advantageously provides protection for the high voltage battery system of an HEV powertrain system in engine cranking situations when the engine does not start. In addition, this method provides the operator with an indication that there is an issue with engine starting and remaining battery energy prior to complete depletion of the available battery energy or the restriction of additional crank attempts. This method maintains a decreasing amount of reserve energy in the battery pack to allow for subsequent start attempts when the cause of the engine not starting has been determined and corrected.

This provides the benefit of protecting the high voltage battery system from damage and of potentially extending the life of the battery pack.

BRIEF DESCRIPTION OF THE DRAWINGS

The present invention will be more fully understood from the accompanying drawings, in which.

DESCRIPTION OF THE PREFERRED EMBODIMENT

Figure 1:
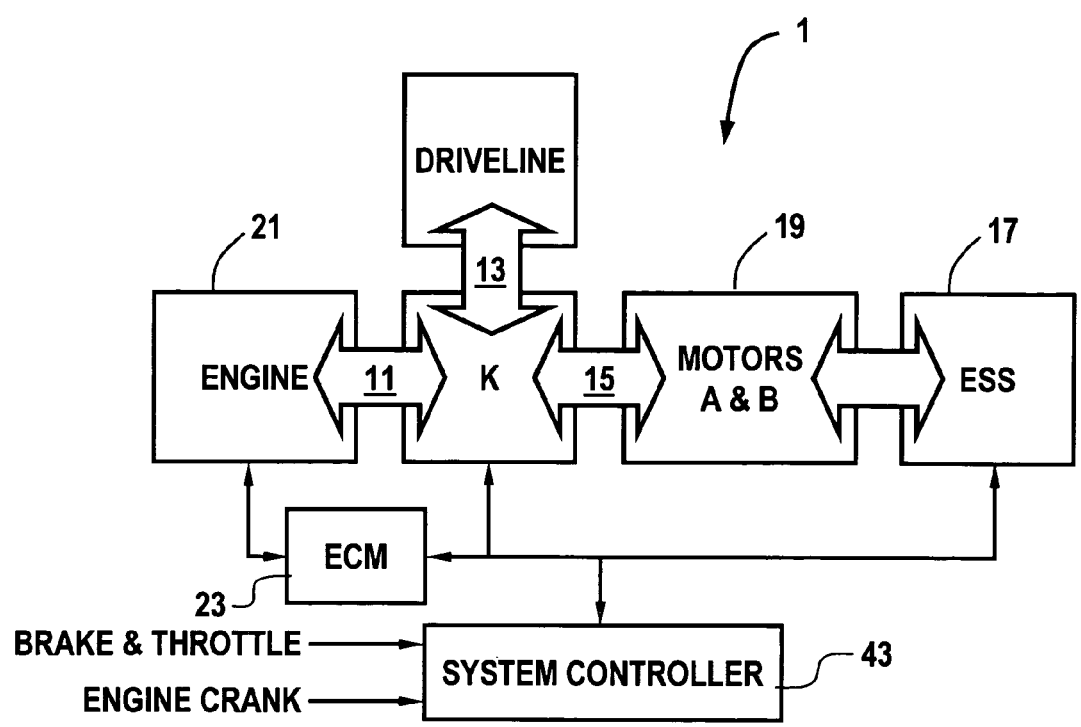
FIG. 1 is a block diagram of a dual-motor, hybrid vehicle powertrain adapted for implementing the present invention.

With reference first to FIG. 1, a block diagram of an exemplary dual-motor, electrically variable transmission powertrain system 1 of a hybrid electric vehicle to which the present invention is applicable is illustrated. The powertrain system 1 includes a diesel compression ignition engine, a vehicle driveline and a pair of electric machines (also referred to herein as electric motors or motors). The motors (identified as A and B), driveline and engine are operatively coupled to one another, for example, through a coupling means (K) comprising one or more planetary gearsets and selective coupling paths established in accordance with application and release of various torque transfer devices, e.g., clutches. The engine is coupled (11) to the coupling means at a mechanical input thereof. The driveline is coupled (13) to the coupling means at a mechanical output thereof. The motors are coupled (15) to the coupling means at various rotating members of the planetary gearsets. Neglecting power losses, the power flows between the engine, driveline and motors balance. And, the power at the driveline is equivalent to the summation of the powers at the engine and motors. Engine, driveline and motor torques follow the same relationships and are known through the various gearsets, power transmission components and the relationships therebetween as embodied in coupling constraint relationships. Speed relationships between the engine, driveline and motor are also known through the various gearsets, power transmission components and the relationships therebetween as embodied in coupling constraint relationships. The vehicle driveline may include such common driveline components as differential gearsets, propshafts, universal joints, final drive gearsets, wheels and tires.

The electric machine receives electric power from and provides electric power to an energy storage system (ESS) which may take the form of one or more batteries in a battery pack module or any appropriate energy storage means capable of bidirectional electrical energy flow. Engine, driveline and motor torques may be in either direction. That is to say, each is capable of bidirectional torque contributions to the powertrain. An exemplary electrically variable transmission comprising a diesel engine, a pair of electric machines and a pair of selectively coupled planetary gearsets and preferred for application of the present control is disclosed in commonly assigned U.S. Pat. No. 5,931,757, the contents of which are incorporated herein by reference. While the invention herein is illustrated with reference to exemplary HEV EVT powertrain system 1, it is believed to be generally applicable to many HEV powertrain configurations, including those having only one electric machine for cranking the engine, as well as those having more than two electric machines, which may be used separately or in various coupling combinations to crank the engine.

The exemplary powertrain system 1 of FIG. 1 also includes a microprocessor based system controller 43 that communicates with the engine via a conventional microprocessor based engine control module (ECM) 23. The ECM 23 preferably communicates with the system controller 43 over a controller area network (CAN) bus. The engine controller, in turn, is adapted to communicate with various engine actuators and sensors (not separately illustrated) used in the control thereof. For example, fuel injectors, exhaust brake or engine brake actuators and rotation sensors are controlled or monitored by discrete signal lines at the engine controller. Among the engine control functions performed by the ECM 23 is an engine start function which includes conventional engine fueling routines for providing a fuel charge to engine cylinders during forced rotation of the engine by an electrical machine. The system controller 43 receives inputs indicative of operator demands including throttle, brake and engine crank. The system controller 43 communicates with various coupling means actuators and sensors used in the control thereof. For example, output rotation sensors, solenoid control valves for controlling torque transfer device hydraulic pressure and apply/release states thereof, and hydraulic fluid pressure switches or transducers, are controlled or monitored by discrete signal lines. The system controller 43 also communicates similarly with a microprocessor based battery pack controller and microprocessor based power electronics controller (not separately illustrated), collectively referred to as ESS controllers. These ESS controllers preferably communicate with the system controller 43 over a CAN bus. The ESS controllers, in turn, are adapted to provide a variety of sensing, diagnostic and control functions related to the battery pack and motor. For example, current and voltage sensors, temperature sensors, multi-phase inverter electronics and motor rotation sensors are controlled or monitored by the ESS controllers. Included among the functions implemented by the ESS controllers is the engine cranking function which comprises a one sided engine rotation speed control responsive to a crank speed signal effective to rotate, with at least one electric machine, the engine up to the crank speed embodied in the crank speed signal and prevent engine speed from sagging below the crank speed but allowing engine combustion torque to deviate the engine speed from the cranking speed.

The present invention requires that at least one electric machine be operatively coupled to the engine such that the engine can be spun up from a zero speed condition thereby. The motor may couple directly to the engine output shaft or may couple thereto via any variety of gearsets (including reduction gearing) or selectively engageable means such as a starting clutch, range clutch or ring and pinion gear arrangement such as a meshingly engaged starter pinion gear and engine flywheel.

As used herein, cranking is understood to include forced rotation of the engine such as by an electric machine and engine fueling for combustion torque production. As used herein, the "engine crank" state refers to an engine state wherein engine cranking occurs by application of an output torque produced by the electric machine. The engine crank state also embodies a method, including a sequence or series of steps, conditions, programs or routines wherein various cranking related diagnostic, control and command functions are performed related to cranking speed, cranking time, the output voltage of the energy storage system, temperature, fueling and other factors by various combinations of the system controller, ECM or other controllers. As used herein, the "engine off" state is generally characterized by a condition wherein the engine speed is zero and the engine is not being fueled and may also embody a sequence or series of steps, conditions or routines whereby the engine attains or maintains this state. As used herein, the "engine on" state refers generally to a state wherein sustained engine torque production has been achieved, generally in response to engine fueling and engine cranking. The engine on state also embodies a method, including a sequence or series of steps, conditions, programs or routines wherein various engine operation-related diagnostic, control and command functions are performed related to engine speed, fueling and other factors by various combinations of the system controller, ECM or other controllers. An additional description of a preferred engine cranking method is found in commonly assigned, co-pending U.S. patent application Ser. No. 10/846,013 (now U.S. Pat. No. 7,028,657), which is herein incorporated by reference in its entirety.

Figure 2:
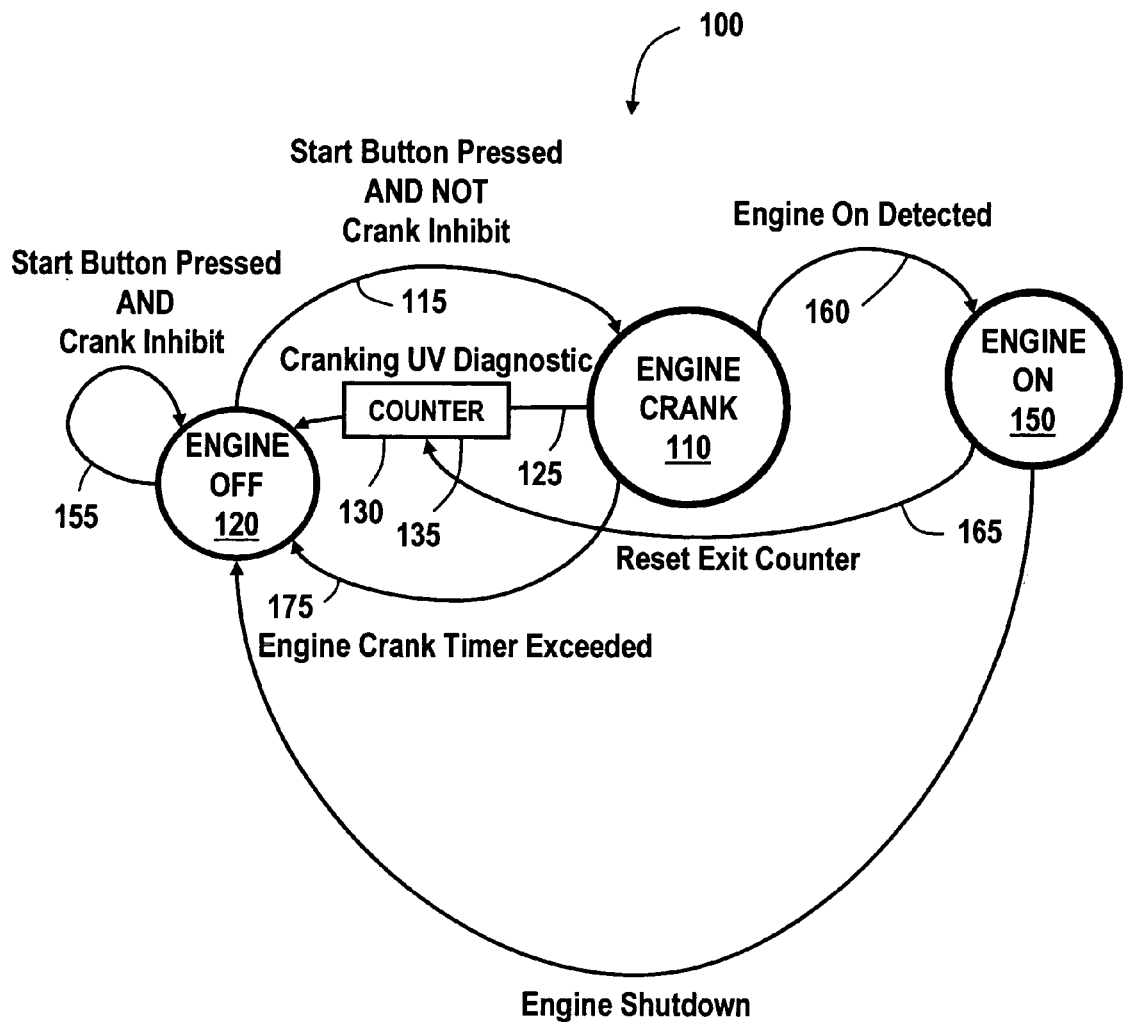
FIG. 2 is a state transition diagram illustrating the method of the present invention.

Referring to FIG. 2, the present invention is described generally with regard to the engine states described above and transitions therefrom. The engine states are represented by circular blocks and the transitions therefrom are represented by arrows. The present invention is a method 100 for controlling the cranking of an engine of a vehicle powertrain system 1 having a rechargeable energy storage system 17 that is adapted to provide electric power to an electric machine 19 for cranking the engine 21, comprising the steps of: initiating an engine crank state 110 from an engine off state 120, as illustrated by transition 115; controlling an exit 125 from the engine crank state 110 as a function of an output voltage of the energy storage system 17 to the electric machine 19 during the crank state 110, wherein if the output voltage is less than a crank undervoltage threshold for a predetermined crank time, the crank state 110 is exited and the system transitions from the engine crank state 110 to the engine off state 120; incrementing 130 a counter 135 for each such exit 125 from the engine crank state 110 to establish an engine crank count; and if the engine crank count does not exceed an engine crank count limit, repeating 140 the preceding steps. It is believed that method 100 may be implemented either in hardware, such as, for example, using various forms of hardwired logic elements, or in software, or in various combinations thereof. However, it is preferred that method 100 comprise a computer control algorithm which may be executed as computer code in one or more computers located in the vehicle, such as found in system controller 43. The steps of the invention are described in further detail below.

Referring to FIG. 2, the step of initiating an engine crank state 110 from engine off state 120 is illustrated by transition 115. Typically the initiator will be a vehicle operator, and initiating 115 will comprise actuation of a start key, push button, knob, lever or other well-known means for actuating a switch. The switch actuation will provide a signal indication to a controller, such as system controller 43, which is adapted to process the signal and provide the necessary control actions for initiating 115 the transition from engine off state 120. This may comprise the initialization or start of a software routine or program.

The engine will be cranked during crank state 110 in accordance with a method, such as that described above. In accordance with this method, a plurality of control, command and diagnostic routines will be executed in order to determine whether the system should continue in the engine crank state, or whether the engine start state has been attained, or whether the engine crank state should be exited in favor of the engine off state. There will typically be a number of diagnostic routines used to test a plurality of system or state parameters, such as the duration of the cranking event, engine speed and the temperature associated with various elements of the system during cranking, to determine whether control commands should be implemented to exit the engine crank state in favor of the engine off state. One such diagnostic comprises method 100.

Figure 3:
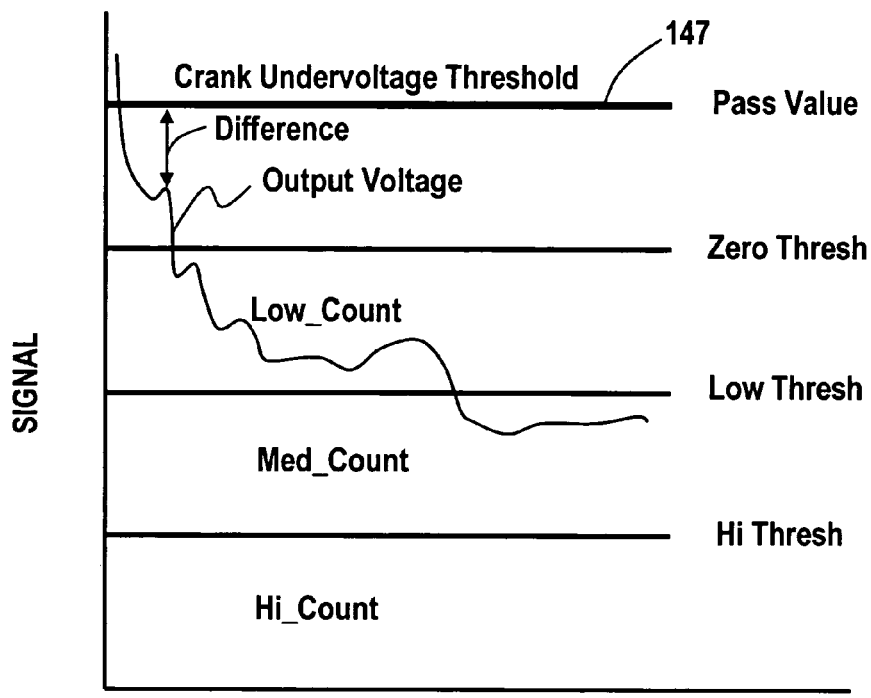
FIG. 3 is a plot illustrating the crank undervoltage threshold of the present invention.

Referring to FIG. 2, method 100 also includes the step of controlling an exit 125 from the engine crank state 110 as a function of an output voltage of the energy storage system 17 to the electric machine 19 during the engine crank state 110, wherein if the output voltage is less than a crank undervoltage threshold for a predetermined crank time, the crank state 110 is exited and the system transitions from the engine crank state 110 to the engine off state 120. The output voltage of the energy storage system is preferably monitored continuously during the engine crank state to ascertain the output voltage to the electric machine by one or more controllers, such as system controller 43. The output voltage of the energy storage system is compared with a crank undervoltage threshold which may be stored in a lookup table, as illustrated in FIG. 3. This cranking undervoltage diagnostic is adapted to force the system out of the cranking state when the output voltage of the ESS drops below the prescribed crank undervoltage threshold during the engine crank state 110, in order to protect the battery from excessive undervoltage.

One means for comparing the output voltage of the ESS with the crank undervoltage threshold to determine whether the output voltage is less than the crank undervoltage threshold for a predetermined crank time is through the use of weighted debouncer logic. This means is utilized so the system can try to crank for a longer time when the voltage is moderately low, but will be forced to exit the engine crank state much more quickly when the voltage is lower.

Figure 4:
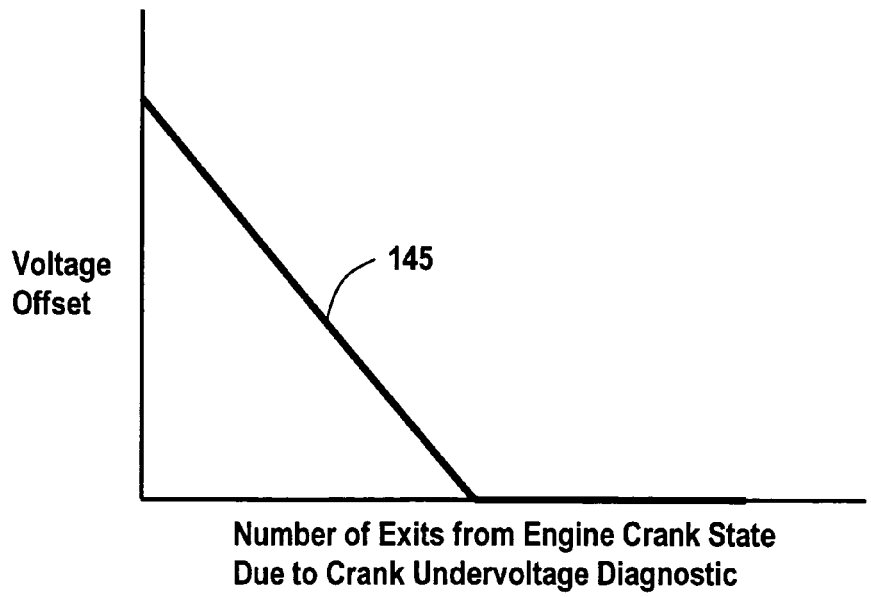
FIG. 4 is a plot of a voltage offset.
Figure 5:
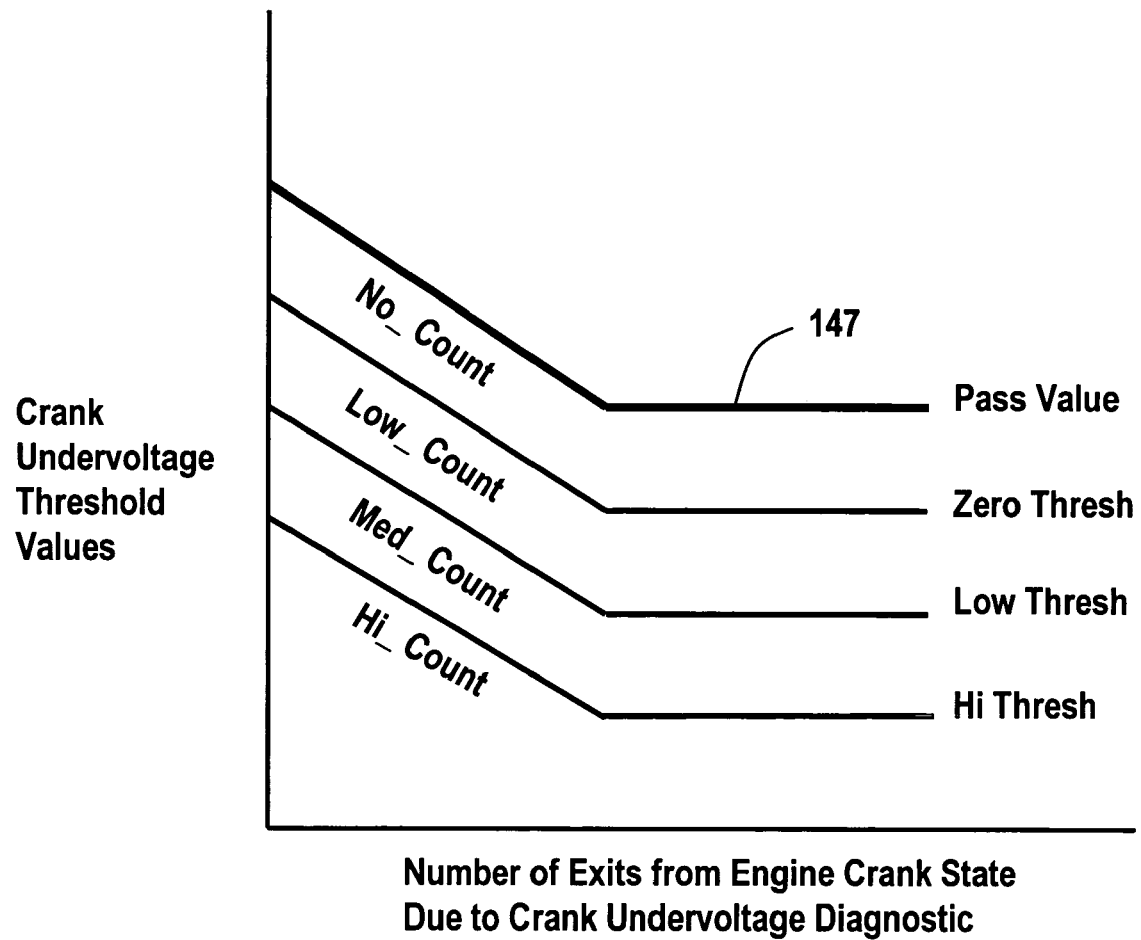
FIG. 5 is a plot of the voltage offset of FIG. 4 applied to the crank undervoltage threshold of FIG. 3.

Referring to FIGS. 3-5, the operation of the debouncer may be described with reference to the logic statements described below:

if Signal>Pass Value, then clear the counter and pass the fault;

if Signal>Zero Thresh, then do not increment the counter;

if Zero_Thresh<Signal<Low_Thresh, increment counter by Low_Count (e.g., 2 counts);

if Low_Thresh<Signal<Hi_Thresh, increment counter by Med_Count (e.g., 10 counts);

if Signal>Hi_Thresh, increment counter by Hi_Count (e.g., 50 counts); and fail fault when counter>Fail_Count (e.g., 100);

wherein the counting increment of the counter is per control loop (e.g. 100 ms control loop) associated with the cranking undervoltage diagnostic. Therefore, the predetermined crank time if the output voltage is within a first range (i.e., defined by the Zero_Thresh and Low_Thresh limits) is five seconds (i.e., 100 loops per fail count/2 counts per loop=50 loops/fail×100 ms/loop=5 sec/fail). Likewise, the predetermined crank time if the output voltage is within a second range (i.e., defined by the Low_Thresh and Hi_Thresh) using the exemplary values given is 1 second, and the predetermined crank time if the output voltage is within a third range (i.e., defined by points which are less than the Hi_Thresh) using the exemplary values given is 0.2 seconds. Thus, the fail fault of the weighted debouncer may be used to provide an exit signal to the controller to exit the engine crank state if the output voltage is less than the crank undervoltage threshold for a predetermined crank time. Further, as indicated by this example, the predetermined crank time may be determined as a function of the magnitude of the difference between the output voltage and the crank undervoltage threshold, as illustrated in FIG. 3. The magnitude of the difference may be defined by a plurality of thresholds, or ranges, as in the example described above and illustrated in FIG. 3, or it may be defined by taking the difference of the output voltage and the threshold directly. Further, as the magnitude of the difference increases, the predetermined crank time decreases.

This diagnostic also accepts a crank undervoltage offset 145 value as illustrated in FIG. 4. This input shifts the crank undervoltage threshold 147 as well as any additional thresholds or ranges (i.e., Zero_Thresh, Low_Thresh, Hi_Thresh) in an additive manner to allow for different fault voltage levels in certain states, as illustrated in FIG. 5. In this case, the offset 145 is determined based on the number of exits from the engine crank state to the engine off state, such that the crank undervoltage offset 145 value decreases with the number of exits. The decreasing offset lowers the crank undervoltage threshold 147 with subsequent exits from the engine crank state to the engine off state allowing more of the reserve battery energy to be used with each pass through the engine crank state as the vehicle is cranked. The application of the offset 145 to the threshold 147 is illustrated in FIG. 5. Thus, by use of the offset 145, the crank undervoltage threshold 147 is a function of the number of exits from the engine crank state to the engine off state due to the diagnostic, preferably a generally decreasing function.

Method 100 also includes a step of incrementing 130 a counter 135 for each such exit 125 from the engine crank state 110 to establish an engine crank count. The step of incrementing 130 a counter 135 should be understood broadly to include all manner of implementing a means of obtaining a count of the transitions between states comprising known techniques for incrementing and decrementing a counter 135 to obtain a count of such transitions.

Method 100 also includes a looping mechanism, such that if the engine crank count does not exceed an engine crank count limit, method 100 includes a step of repeating 140 the preceding steps of the method. The engine crank count limit is the maximum number of exits 125 from the engine crank state to the engine off state permitted due to the diagnostic.

Method 100 may also include an additional level of protection in response to extreme undervoltage situations, particularly where the crank undervoltage diagnostic has executed as described herein and the engine crank count limit has been exceeded (i.e., the maximum number of attempts to start the engine have been utilized), wherein if the engine crank count exceeds the engine crank count limit, method 100 includes setting a crank count limit or inhibit fault in the system which disallows subsequent initiating of the engine crank state until the fault is cleared. Such a fault may be utilized to lock out the energy storage system from further utilization and potential damage of the battery pack due to extreme undervoltage conditions. Referring to FIG. 2, if an attempt is made to initiate the transition 115 from the engine off state to the engine crank state by pressing the start button while the fault exists, the system will execute the action represented by transition 155, wherein there is no change in state. In one embodiment, the fault may be set such that it may only be cleared by trained service personnel using a service tool that is adapted to clear the fault. Once the maximum number of exits from the engine start state to the engine off state has been exceeded, the service tool must be used to reset the fault and re-enable cranking. The service technician will be given one start attempt and one additional execution of method 100. If the vehicle does not transition to the engine on state 150 and the engine start does not occur, the system exits according to the crank undervoltage diagnostic from the engine crank state to the engine off state, the crank count limit or inhibit fault occurs again because the maximum number of exits has been exceeded, and the fault will again have to be reset from the service tool for subsequent start attempts. The cranking undervoltage diagnostic will remain be active as described however, to protect the batteries from complete discharge.

If the engine on state 150 is achieved as illustrated by transition 160, it is generally preferable to incorporate a step of resetting 165 counter 135, as the energy storage system will, in all probability, be recharged sufficiently to alleviate any concerns about battery undervoltage during this state. Resetting 160 may be done immediately upon attaining engine on state 150, or may also be subject to various verification tests, delays, diagnostic routines or other means of insuring that the engine on state has been successfully attained prior to resetting 165 counter 135.

Many other additional transitions are possible between various engine states, particularly between engine crank state 110 and engine off state 120, such as a transition 175 due to the engine cranking time exceeding a cranking limit, which may be implemented in conjunction with transition 115 in accordance with method 100.

The method may also incorporate a step of providing 160 an indication of the exit crank count. The count may be utilized in conjunction with the controller to provide all manner of indications of the exit crank count, such as indications that may be sensed by an operator, and may include all manner of well-known audible indications, such as a bell, horn, or other audible indication, visual indications, such as a graphic display, counter or other well-known visual indications, as well as a tactile indication, such as vibrating the start actuator, or altering its response characteristics.

Further scope of applicability of the present invention will become apparent from the drawings and this detailed description, as well as the following claims. However, it should be understood that the detailed description and specific examples, while indicating preferred embodiments of the invention, are given by way of illustration only, since various changes and modifications within the spirit and scope of the invention will become apparent to those skilled in the art.

The invention claimed is:

1. A method for controlling the cranking of an engine of a vehicle powertrain system having a rechargeable energy storage system that is adapted to provide electric power to an electric machine for cranking the engine, comprising the steps of:

initiating an engine crank state from an engine off state;

controlling an exit from the engine crank state as a function of an output voltage of the energy storage system to the electric machine during the crank state, wherein if the output voltage is less than a crank undervoltage threshold for a predetermined crank time, the crank state is exited and the system transitions from the engine crank state to the engine off state;

incrementing a counter for each such exit from the engine crank state to establish an engine crank count; and if the engine crank count does not exceed an engine crank count limit, repeating the preceding steps.

2. The method of claim 1, wherein the crank undervoltage threshold is a function of the number of such exits from the engine crank state to the engine off state.

3. The method of claim 2, wherein the crank undervoltage threshold decreases as a function of the number of such exits.

4. The method of claim 3, wherein the predetermined crank time is a function of a magnitude of a difference between the output voltage and the crank undervoltage threshold.

5. The method of claim 4, wherein as the magnitude of the difference increases, the predetermined crank time decreases.

6. The method of claim 1, further comprising, if an engine on state is detected, resetting the engine crank count.

7. The method of claim 1, further comprising:

if the engine crank count exceeds the engine crank count limit, setting a fault in the system which disallows subsequent initiating of the engine crank state until the fault is cleared.

8. The method of claim 7, further comprising:

clearing the fault, and repeating the preceding steps starting with initiating an engine crank state from an engine off state.

9. The method of claim 1, further comprising:

providing an indication of the exit crank count.

10. The method of claim 9, wherein the indication is selected from a group consisting of an audible indication, a visual indication and a tactile indication.

11. A method for controlling the cranking of an engine of a vehicle powertrain system having a rechargeable energy storage system that is adapted to provide electric power to an electric machine for cranking the engine in response to the control actions of a controller, the method adapted for execution as code in a computer controller, comprising the steps of:

initiating an engine crank state from an engine off state;

controlling an exit from the engine crank state as a function of an output voltage of the energy storage system to the electric machine during the crank state, wherein if the output voltage is less than a crank undervoltage threshold for a predetermined crank time, the crank state is exited and the system transitions from the engine crank state to the engine off state;

incrementing a counter for each such exit from the engine crank state to establish an engine crank count;

if the engine crank count does not exceed an engine crank count limit, repeating the preceding steps; and if the engine crank count exceeds the engine crank count limit, setting a fault in the controller which disallows subsequent initiating of the engine crank state until the fault is cleared.

12. The method of claim 11, wherein the crank undervoltage threshold is a function of the number of such exits from the engine crank state to the engine off state.

13. The method of claim 12, wherein the crank undervoltage threshold decreases as a function of the number of such exits.

14. The method of claim 13, wherein the predetermined crank time is a function of a magnitude of a difference between the output voltage and the crank undervoltage threshold.

15. The method of claim 14, wherein as the magnitude of the difference increases, the predetermined crank time decreases.

16. The method of claim 12, wherein the predetermined crank time is determined in relation to plurality of predetermined voltage ranges which are less than the crank undervoltage threshold, each voltage range having associated with it a corresponding predetermined crank time, and wherein those ranges of voltage which are closer to the crank undervoltage threshold have predetermined crank times which are longer than those ranges which are farther from the voltage threshold.

17. The method of claim 11, further comprising,
if an engine on state is detected, resetting the engine crank count.

18. The method of claim 11, further comprising:
clearing the fault in the controller; and
repeating the preceding steps starting with initiating an engine crank state from an engine off state.

19. The method of claim 11, further comprising:
providing an indication of the exit crank count.

20. The method of claim 19, wherein the indication is selected from a group consisting of an audible indication, a visual indication, and a tactile indication.

* * * * *